United States Patent [19]
Giebel et al.

[11] Patent Number: 5,719,377
[45] Date of Patent: Feb. 17, 1998

[54] DUAL HEATING ELEMENT ELECTRIC GRILL HAVING A SMOKER HEATING ELEMENT FOR VAPORIZING GREASE AND JUICES FROM FOODSTUFF

[75] Inventors: Michael Giebel; David Landis, both of Joplin; Henry Schubert, Neosho, all of Mo.

[73] Assignee: Sunbeam Products, Inc., Delray Beach, Fla.

[21] Appl. No.: 486,109

[22] Filed: Jun. 7, 1995

Related U.S. Application Data

[63] Continuation-in-part of Ser. No. 290,434, Aug. 15, 1994, abandoned.

[51] Int. Cl.[6] .............................. H05B 3/68; A21B 1/00; A47J 27/00
[52] U.S. Cl. ........................... 219/446; 219/391; 99/444
[58] Field of Search .............................. 219/385, 391, 219/395, 401, 446; 99/444, 445, 446, 450, 452, 422, 425

[56] References Cited

U.S. PATENT DOCUMENTS

| | | | |
|---|---|---|---|
| 1,644,255 | 10/1927 | Kercher et al. | 219/464 |
| 1,817,118 | 8/1931 | Adami | 99/445 |
| 3,002,444 | 10/1961 | Hoebing . | |
| 3,225,682 | 12/1965 | Javio | 99/446 |
| 3,301,170 | 1/1967 | Beasley . | |
| 3,517,602 | 6/1970 | Horton . | |
| 3,742,726 | 7/1973 | Fautz | 99/445 |
| 3,761,737 | 9/1973 | Robbins, Jr. | 219/501 |
| 3,789,748 | 2/1974 | Rappoport | 99/446 |
| 4,224,743 | 9/1980 | Erickson et al. | 34/219 |
| 4,428,281 | 1/1984 | Miller | 99/445 |
| 4,987,827 | 1/1991 | Marquez | 49/401 |
| 5,036,180 | 7/1991 | Scott . | |
| 5,105,725 | 4/1992 | Haglund | 99/446 |
| 5,176,067 | 1/1993 | Higgins | 99/446 |
| 5,276,307 | 1/1994 | Higgins | 219/386 |
| 5,304,781 | 4/1994 | Stalsberg | 219/501 |
| 5,355,779 | 10/1994 | O'Brien | 99/446 |
| 5,363,748 | 11/1994 | Boehm et al. | 49/401 |
| 5,396,048 | 3/1995 | King et al. | 219/494 |
| 5,447,097 | 9/1995 | Rhee | 99/444 |

*Primary Examiner*—Teresa J. Walberg
*Assistant Examiner*—Sam Paik
*Attorney, Agent, or Firm*—Michael J. Kline; Carol I. Bordas; Darren E. Wolf

[57] ABSTRACT

An electric grill which vaporizes grease and juices and sears the food being cooked. The grill has two sets of heating elements, one located directly beneath the cooking surface and the second located proximate a smoker box. The grease and juices fall from the food located on the cooking surface onto the bottom of the grill which channels the grease and juices into the smoker box. The bottom of the grill also functions as a reflector plate to redirect heat towards the cooking surface. The grease, juices, and, optionally, wood chips may vaporized and smoked by the heating element located proximate the smoker box. A printed circuit board regulates the current passing through the heating elements.

13 Claims, 7 Drawing Sheets

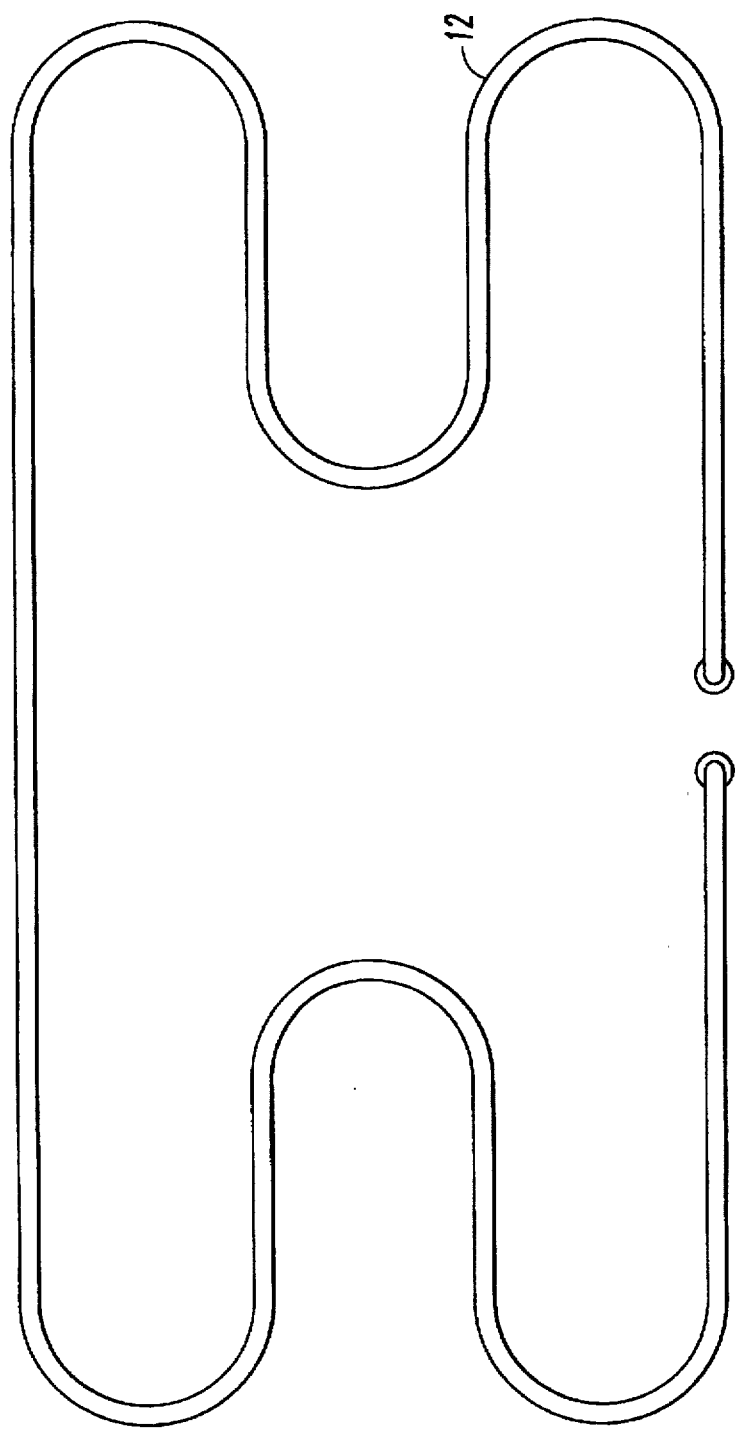
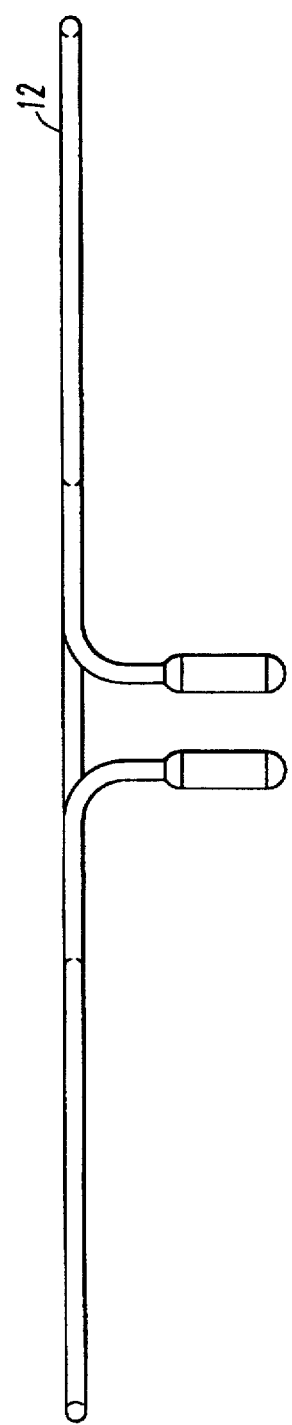
FIG.3
FIG.4

FIG.8
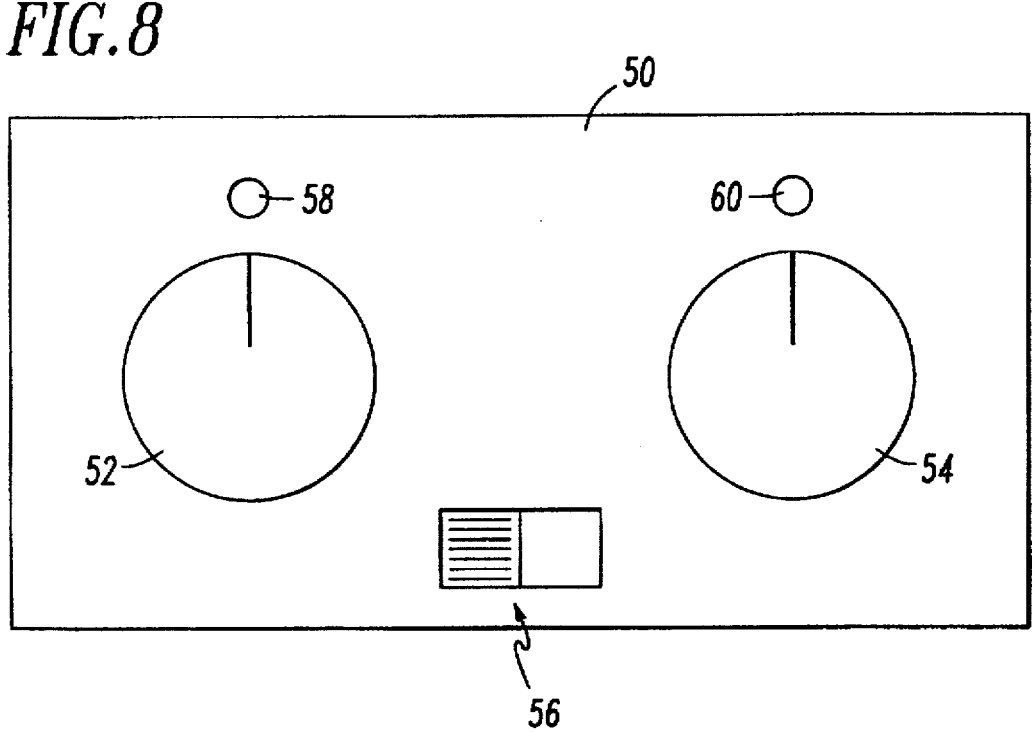
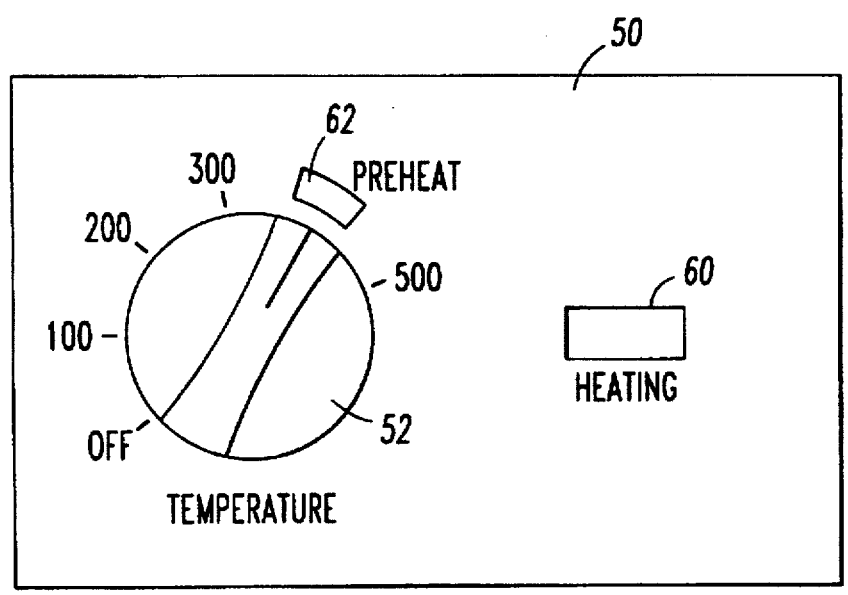
FIG.13

DUAL HEATING ELEMENT ELECTRIC GRILL HAVING A SMOKER HEATING ELEMENT FOR VAPORIZING GREASE AND JUICES FROM FOODSTUFF

This application is a continuation-in-part of application Ser. No. 08/290,434, filed Aug. 15, 1994, now abandoned.

FIELD OF THE INVENTION

The present invention relates to an improved electric grill. More specifically, the invention relates to an improved electric grill which both sears the food being cooked and vaporizes the juices from the food to give it a "barbecue flavor".

BACKGROUND OF THE INVENTION

When cooking on an electric grill it is desirable to vaporize some of the grease and juices from the food being cooked so that the food will take on a "barbecue flavor." This is known in the prior art as disclosed in Beasley, U.S. Pat. No. 3,301,170 and Horton, U.S. Pat. No. 3,517,602. Failure to vaporize these juices, as in Scott, U.S. Pat. No. 5,036,180, results in the food tasting as if it had been baked in an oven. This dry taste results because the food has not been given the opportunity to absorb the smoke and the vaporized juices.

As discussed in Beasley, U.S. Pat. No. 3,301,170, it is also desirable in an electric grill to sear the food on the cooking grid, and thus give the cooked food the appearance and texture of food cooked on a charcoal grill. Prior to the present invention, however, both of the above-described aspects, searing the food and vaporizing the juices, could not be satisfactorily accomplished by the same electric grill. As shown in Hoebing, U.S. Pat. No. 3,002,444 and Scott, U.S. Pat. No. 5,036,180, a popular way to design an electric grill is to place the heating elements directly below the cooking grid. This close proximity of the heating element to the food allows the food to cook quickly and allows for the cooking grid to sear the food, providing the desired texture and appearance. This design, however, leaves no room for a drip plate in which the juices can be vaporized thereby imparting barbecue flavor to the food. To accommodate the drip plate, the heating element must be moved several inches below the cooking grid, as shown in Horton, U.S. Pat. No. 3,517,602. Moving the heating element, however, means that it will take longer to cook the food on the cooking grid. In addition, the heating element will not provide enough heat to cause the cooking grid to sear the food. Thus, the desirable texture and appearance of food cooked on a charcoal grill will be missing in a design such as Horton. A solution to this problem is not as simple as increasing the output of the heating element, because present Underwriter Laboratory standards limit the total output for 120 Volt, 15 Amp service in households to 1800 Watts.

One attempt at solving this problem is shown in Beasley, U.S. Pat. No. 3,301,170. The Beasley design incorporates the heating element into the cooking grid. As a result, the heating element is close enough to the food to sear it on the cooking grid. Beasley provides flavor to the food because the grease and juices which are in contact with the cooking grid are vaporized and to some extent provide a "barbecued flavor". The disadvantage of Beasley is that the cooking grid vaporizes only a small portion of the grease and juices. The majority of the grease and juices falls through the cooking grid and do not get vaporized. As a result, the "barbecue flavor" imparted to the food is limited.

Hoebing, U.S. Pat. No. 3,002,444, discloses the use of multiple sets of heating elements. In Hoebing, a second heating element is placed on the side of the grill and used to smoke wood chips to impart a "smoked" flavor to the food. Hoebing does not, however, suggest that this second element could be used to vaporize grease and juices to impart a "barbecue flavor" onto the food. In fact, this second heating element cannot be used to vaporize juices because it is located off to the side of the grill and not below the cooking grid. As a result, the grease and juices will not be collected around the second heating element and, therefore, they will not be vaporized.

SUMMARY OF THE INVENTION

The present invention is an improved electric grill. The invention consists of a cooking grid on which the food is placed, a main heating element located below the cooking grid, a bottom portion located beneath the main heating element, a smoker box integrated into the bottom portion, and a smoker heating element located in the smoker box. The bottom portion acts as a reflector plate and is sloped so as to channel the grease and juices falling from the cooking surface into the smoker box. The smoker element, located in the smoker box, can heat the grease and juices in order to vaporize them and flavor the food being cooked on the cooking grid. The smoker box may also hold wood chips which can be burned by the smoker element to give the food a smoked flavor.

The main heating element provides the primary heat for cooking the food. The smoker heating element provides heat which can be used to supplement the main heating element or to warm food without burning it, as well as vaporizing the grease and juices and smoking wood chips in the smoker box.

The use of two sets of heating elements allows for both a "barbecue flavor" and for the searing of the food on the cooking grid without exceeding the recommended standards for 120 Volt, 15 Amp household service.

The heating elements may be controlled with the use of a printed circuit board which regulates the flow of current through the heating elements. A temperature sensor may be employed to provide feedback for the regulation of the temperature of the heating elements.

BRIEF DESCRIPTION OF THE DRAWINGS

FIG. 3 is a top plan view of the main heating element.

FIG. 4 is a side plan view of the main heating element.

FIG. 8 is a front plan view of the control panel of the present invention.

FIG. 13 is a plan view of the control panel and the means for controlling the main heating element.

DETAILED DESCRIPTION OF THE PREFERRED EMBODIMENT

Figure 1:
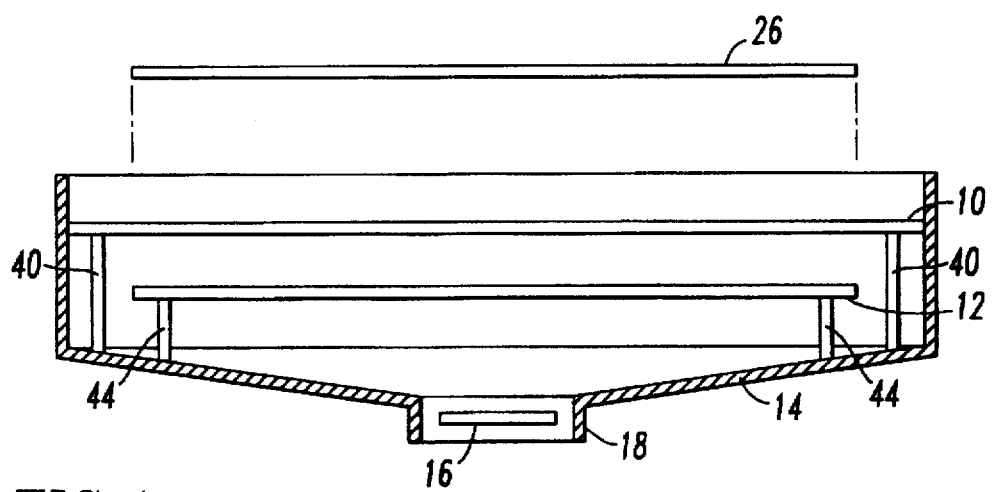
FIG. 1 is a cross-sectional view of the grill of the present invention.

As shown in FIG. 1, the present invention contains a cooking surface 10 on which food is cooked. In a preferred embodiment of the present invention the cooking surface is a cooking grid 10. Any cooking surface, however, such as the cooking griddle described below, may be used with the present invention. The cooking grid 10, as well as any other cooking surface 10, is preferably cast aluminum with a teflon coating. The teflon coating helps to prevent food from sticking to the cooking grid 10 and allows for easy cleaning of the cooking grid 10. A most preferred embodiment of the present invention also includes a warming rack 26. The warming rack 26 is located above the cooking grid 10 and allows the user to keep cooked food warm for an extended period of time, and allows one to slow cook food without burning the food. Preferably, the warming rack 26, like the cooking grid 10, is cast aluminum with a teflon coating.

Figure 2:
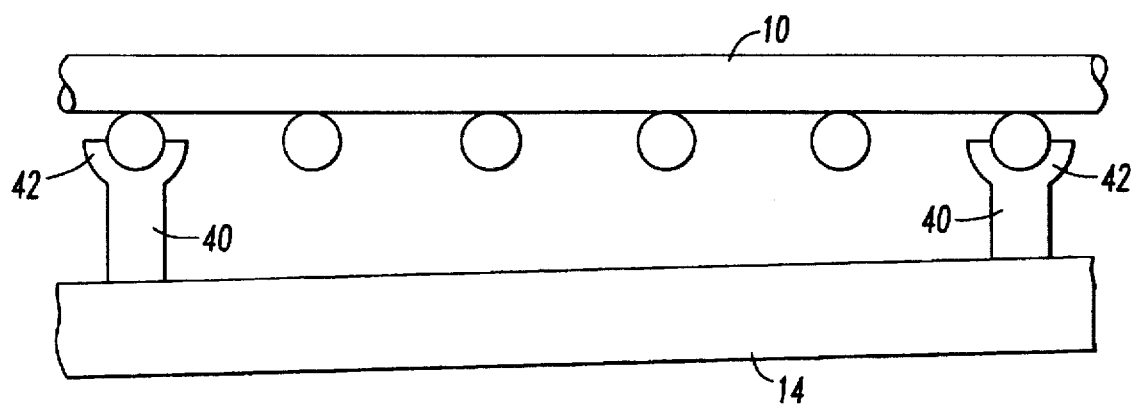
FIG. 2 is a side plan view of the cooking surface and the supports therefor.

As shown in the side plan view of FIG. 2, the cooking grid 10 is preferably suspended above the bottom portion 14 by a plurality of saddle supports 42 mounted onto vertical members 40 protruding from the bottom portion 14. The saddle supports 42 prevent the cooking grid from moving while food is being placed onto or removed from the cooking grid 10, and it also allows the cooking grid 10 to be easily removed for cleaning or replacement. In addition, this method of support provides minimal contact between the cooking grid 10 and other parts of the grill, thereby providing a measure of thermal insulation to the cooking grid 10. If the cooking grid 10 were to be in good thermal connection with, for example, the bottom portion 14, the bottom portion 14 would act as a heat sink and adversely effect the performance of the grill.

In a most preferred embodiment of the present invention, a griddle plate (not shown) is provided which can be placed on the saddle supports 42 in place of a cooking grid 10. This griddle plate would allow the user an alternative to traditional barbecue grill cooking. This griddle plate may include holes therein to allow the grease and juices to fall onto the bottom portion 14 and be funneled into the smoker box 18 for vaporization or collection and disposal. Preferably, the cooking grid 10 is divided into two pieces, with each piece covering approximately one half of the cooking surface 10. In this way, half of the cooking surface 10 may be a grid and half of the cooking surface may be a griddle plate.

Below the cooking surface 10 is the main heating element 12. As shown in FIG. 3, the main heating element 12, as viewed from above, preferably forms the outline of an "H." This pattern provides even heating of the cooking surface 10. When viewed from the side, as shown in FIG. 4, the main heating element 12 is generally within a horizontal plane.

Figure 5:
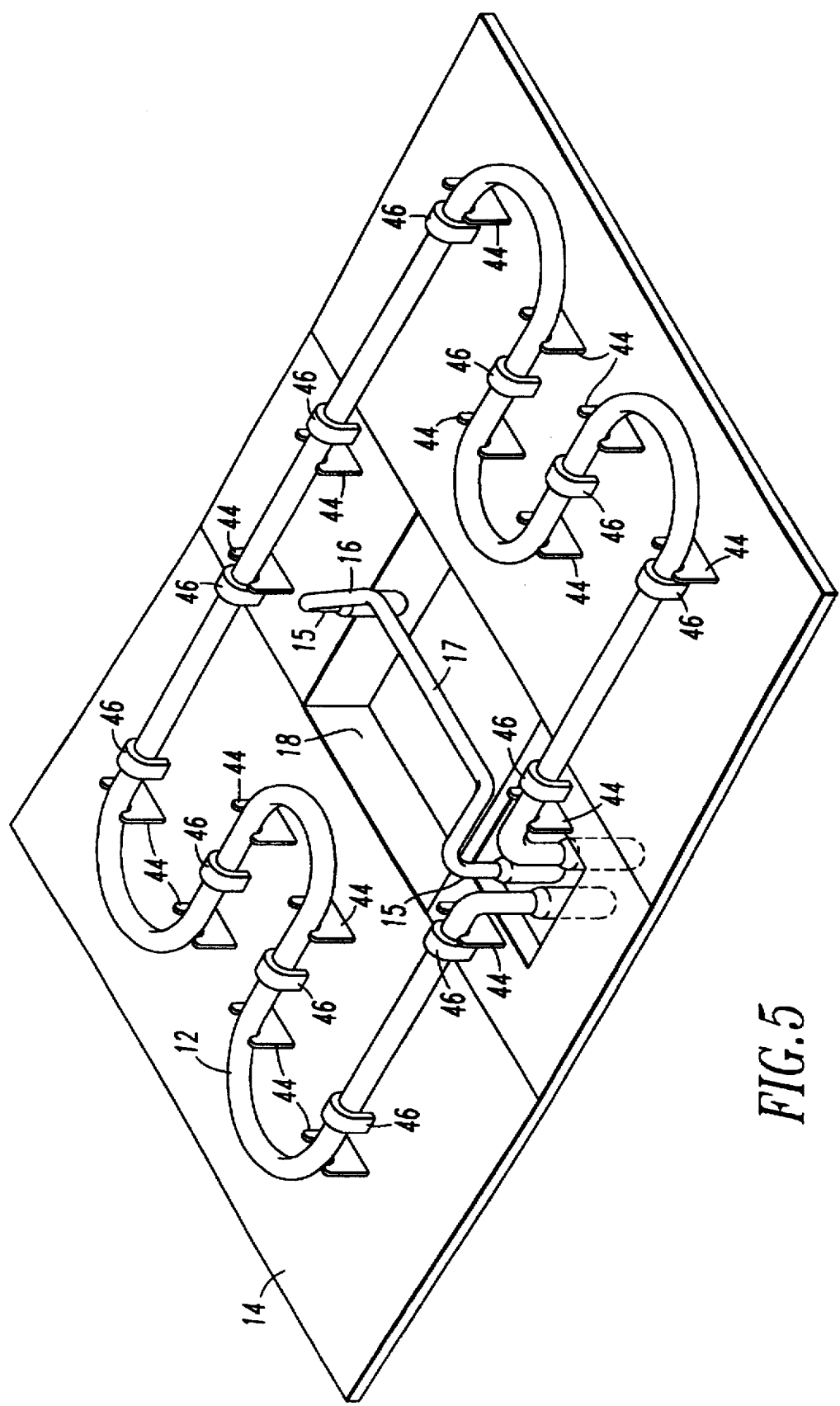
FIG. 5 is a perspective view of the main heating element, smoker heating element, bottom surface, and smoker box of the present invention.
Figure 5A:
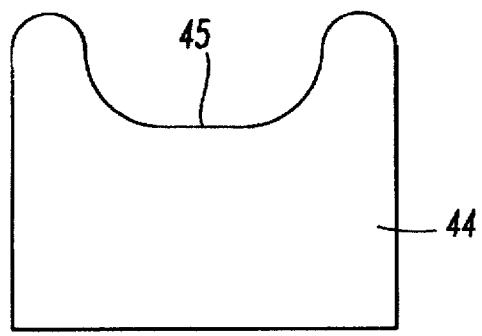
FIG. 5A is a front plan view of a support means for the main heating element of the present invention.

As seen in FIG. 5, the main heating element 12 is preferably attached to the bottom portion 14 of the grill with the use of a plurality of support means 44 and fastening means 46. The support means 44 suspends the main heating element 12 above the bottom portion 14. The fastening means 46 prevent the main heating element 12 from being removed from the bottom portion 14. In a preferred embodiment of the present invention, as shown in FIG. 5A, the support means 44 have a concave saddle portion 45 in which the main heating element 12 rests. In the same preferred embodiment, the fastening means 46 are inverted "U" shaped members with their open end attached to the bottom portion 14 so as to hold the main heating element onto the bottom portion 14. By limiting the amount of contact between the main heating element 12 and the bottom portion 14, the main heating element 12 becomes more thermally insulated from the bottom portion 14. This thermal insulation prevents the bottom portion 14 from acting as a heat sink and lowering the temperature of the main heating element 12 and adversely effecting the performance of the grill. Additional thermal insulation means may also be used to further insulate the main heating element 12, such as the use of thermally insulating materials for the support means 44 and fastening means 46.

As seen in FIGS. 1 and 5, the bottom portion 14 is located beneath the main heating element 12. The bottom portion 14 redirects the downward component of the heat generated by the main heating element 12 up towards the cooking surface 10. The bottom surface 14 is sloped so that grease and juices falling from the food onto the bottom portion 14 will flow into a smoker box 18 located in or adjacent to the bottom portion 14. The smoker box 18 may also contain wood chips which can be smoked to impart flavor to the food being cooked on the grill. The bottom portion 14 is preferably stamped from cold rolled aluminum which, when heated, becomes dark in color, absorbs heat, and since aluminum is a thermal conductor, the heat will be more evenly distributed along the bottom portion 14. As a result, the heat will also be more evenly distributed along the grill. This characteristic helps to eliminate hot spots on the grill and provide for more even heating. The bottom portion 14 may also be made from cold rolled aluminized steel and stainless steel, as well as other materials known to be well suited for use in a grill.

A smoker heating element 16 is located proximate preferably located within the smoker box 18. This smoker heating element 16 provides heat which supplements the cooking capacity of the main heating element 12, vaporizes grease and juices in the smoker box 18 and smokes wood chips in the smoker box 18.

Figure 6:
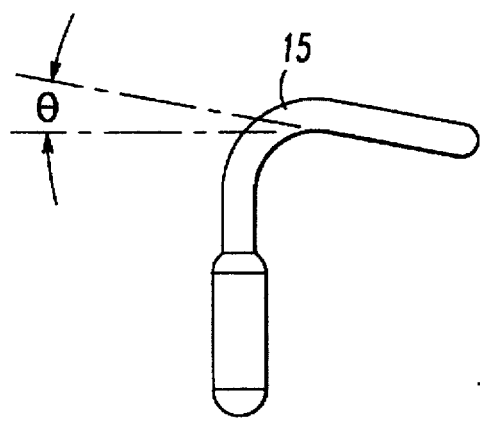
FIG. 6 is a side plan view of the smoker heating element.
Figure 7:
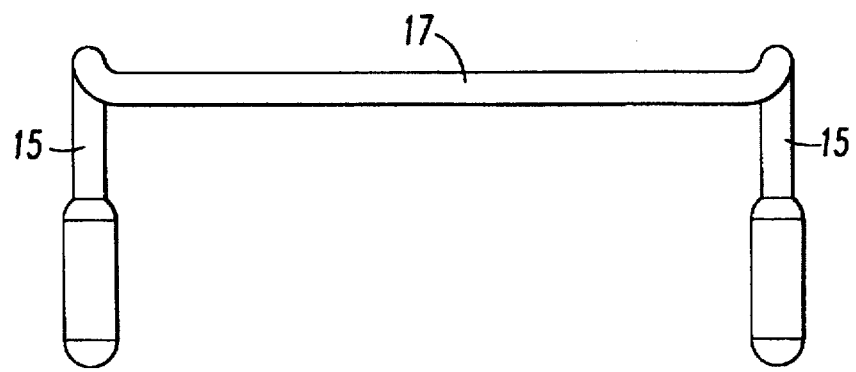
FIG. 7 is a front plan view of the smoker heating element.

The smoker heating element 16 may be of any shape and configuration that allows for heating of the grease, juices, and wood chips. The smoker heating element 16, however, is preferably shaped as shown in FIGS. 5, 6 and 7. As can be seen from the drawings, the ends 15 of the smoker heating element 16 are outside of the smoker box 18. The center portion 17 of the smoker heating element 16 is located within the smoker box 18 so as to be in contact with the grease, juices and wood chips. Alternatively, the smoker heating element 16 may be located beneath or beside the smoker box 18.

The portion of the smoker heating element 16 where the center portion 17 meets the ends 15 is at a slight incline. The angle of the incline, theta, is approximately 10 degrees with respect to a horizonal line. This incline is best seen in FIGS. 6 and 7 and is designed for the purpose of preventing grease and juices in the smoker box 18 from flowing along the smoker heating element 16 and out of the smoker box 18. Since grease and juices do not readily flow up an incline, they are not likely to flow from the center portion 17 to the ends 15 of the smoker heating element 16 and out of the smoker box 18.

The smoker heating element 16, of course, need not be used if it is desireable to merely collect the grease and juices without vaporizing them or smoking wood chips.

Figure 11:
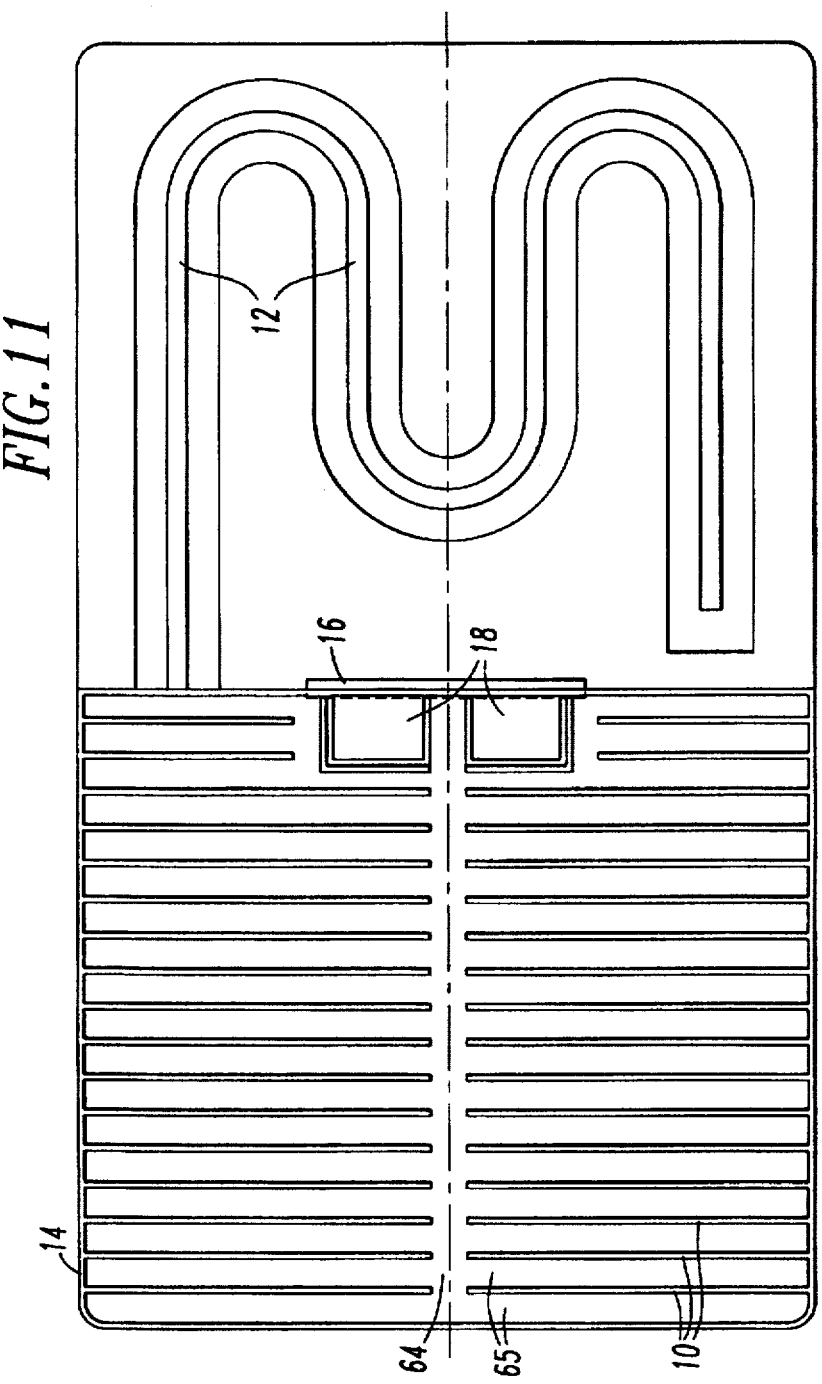
FIG. 11 is a top plan view of the grill of the present invention wherein the bottom portion and the cooking grid have been removed from the right half of the grill, exposing the heating elements.

In a most preferred embodiment of the present invention, the main heating element 12 and the smoker heating element 16 are located beneath the bottom portion 14. This is best seen in FIG. 11, which shows a top plan view of the grill of the present invention, wherein the bottom portion 14 and cooking grid 10 have been removed from the right half of the grill, exposing the heating elements 12 and 16.

Figure 10:
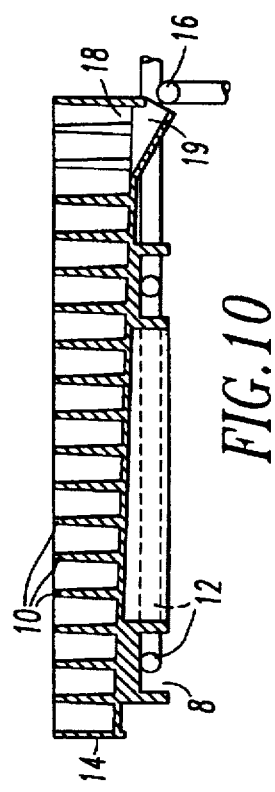
FIG. 10 is a front cross-sectional view of one half of the grill of the present invention.

The bottom portion 14 includes a smoker box 18, with the smoker heating element 16 located beneath the smoker box 18. The bottom portion 14 also may be removable. As can be clearly seen in FIGS. 1, 10, and 11, the smoker box 18 is preferably integrated into, and located approximately in the center of, the bottom portion 14. The smoker box 18 may have a solid lower portion to retain all the grease and juices which drain into it. Conversely, as shown in FIG. 10, the smoker box 18 may have an opening 19 at the bottom so that grease and juices may drip onto and be vaporized by the smoker heating element 16.

Figure 12:
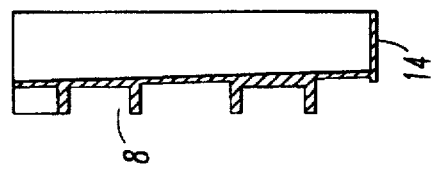
FIG. 12 is a side cross-sectional view of one half of the grill of the present invention.

To facilitate moving the grease and juices from the bottom portion to the smoker box 18, there is provided a central grease channel 64, running along the cooking grids 10 and terminating at the grease collection means 18. As seen in FIG. 10, the central grease channel 64 is sloped so that grease flows into the grease collection means 18. In addition, there are provided side grease channels 65 which run between the cooking grids 10. As seen in FIG. 12, the side grease channels 65 are sloped so as to cause grease to flow toward the central grease channel 64, and thereafter the grease will flow down the central grease channel 64 into the grease collection means 18.

Also in the most preferred embodiment, the cooking grid 10 is incorporated into the bottom portion 14. As seen in FIG. 10, the cooking grid 10 is a plurality of vertical extensions of the bottom portion 14. This type of cooking grid 10 supports food above the bottom portion 14 in much the same way as a conventional cooking grid would. Other embodiments of this invention, such as conventional cooking grids mounted in a conventional manner, are also contemplated.

The smoker heating element 16 and the main heating element 12 may be fastened to a base portion 13 using the support means 44 and fastening means 46 as previously described.

Also in this most preferred embodiment, on the underside of the bottom portion 14 there is provided a recessed area 8, as shown in FIGS. 10 and 12. This recessed area 8 corresponds to the size and shape of the heating elements 12 and 16. The recessed area 8 allows the heating elements 12 and 16 to be partially recessed within the bottom portion 14, thereby increasing the heat transfer between the heating elements 12 and 16 and the bottom portion 14.

In this most preferred embodiment, both the main heating element 12 and the smoker heating element 16 are concealed beneath the bottom portion 14. This arrangement protects the heating elements 12 and 16 from any objects which may from time to time fall between the cooking grid. Furthermore, this arrangement facilitates easy clean-up of the grill by allowing the bottom portion 14 to be easily removed and cleaned without being obstructed by the heating elements 12 and 16.

Also, in the most preferred embodiment of the present invention, there is a preheat function. It has been found that the ideal temperature for searing meat on a grill is between 390° F. and 425° F. As a result, in this most preferred embodiment of the present invention, an indicator 62 is provided on the control panel 50 so as to indicate the appropriate setting for the means 52 for controlling the main heating element, so as to achieve this optimal grilling temperature of 390° F. to 425° F. This indicator 62 is preferably embodied by a mark on the control panel 50, such as a line provided by a silk screen process, a notch in the control panel 50, an indentation, etc.

As will be discussed in more detail below, when the temperature sensed inside the grill is less than the temperature selected by the means 52 for controlling the main heating element, a heating indicator means 60 is illuminated. When the temperature sensed within the grill is equal to or greater than the temperature selected by the means 52 for controlling the main heating element, then the heating indicator means 60 is not illuminated. As a result, when the means 52 for controlling the main heating element is positioned so that it selects the preheat indication 62, then the heating indicator means 60 will be illuminated and will stay illuminated until the temperature sensed within the grill is approximately equal to the ideal temperature for searing meat on a grill.

When constrained by the present Underwriters Laboratory limitation of 1800 Watts of total output for 120 Volt, 15 Amp household service, it has been found that the optimum results can be obtained with approximately a 1600 Watt main heating element 12 and approximately a 120 Watt lower heating element.

As seen in FIG. 8, the grill of the present invention preferably has a control panel 50. The control panel 50 has a means for supplying power 56 to the control panel 50, a means for controlling the main heating element 52, a means for controlling the smoker heating element 54, a "power on" indicator means 58, and a "heating" indicator means 60.

In the present preferred embodiment, the means for supplying power 56 is a rocker switch and the indicator means 58 and 60 are light emitting diodes ("LED's"). The means for controlling the main heating element 52 and the means for controlling the smoker heating element 54 are a printed circuit board with potentiometers providing the input for the desired setting of the heating elements 12 and 16.

Figure 9:
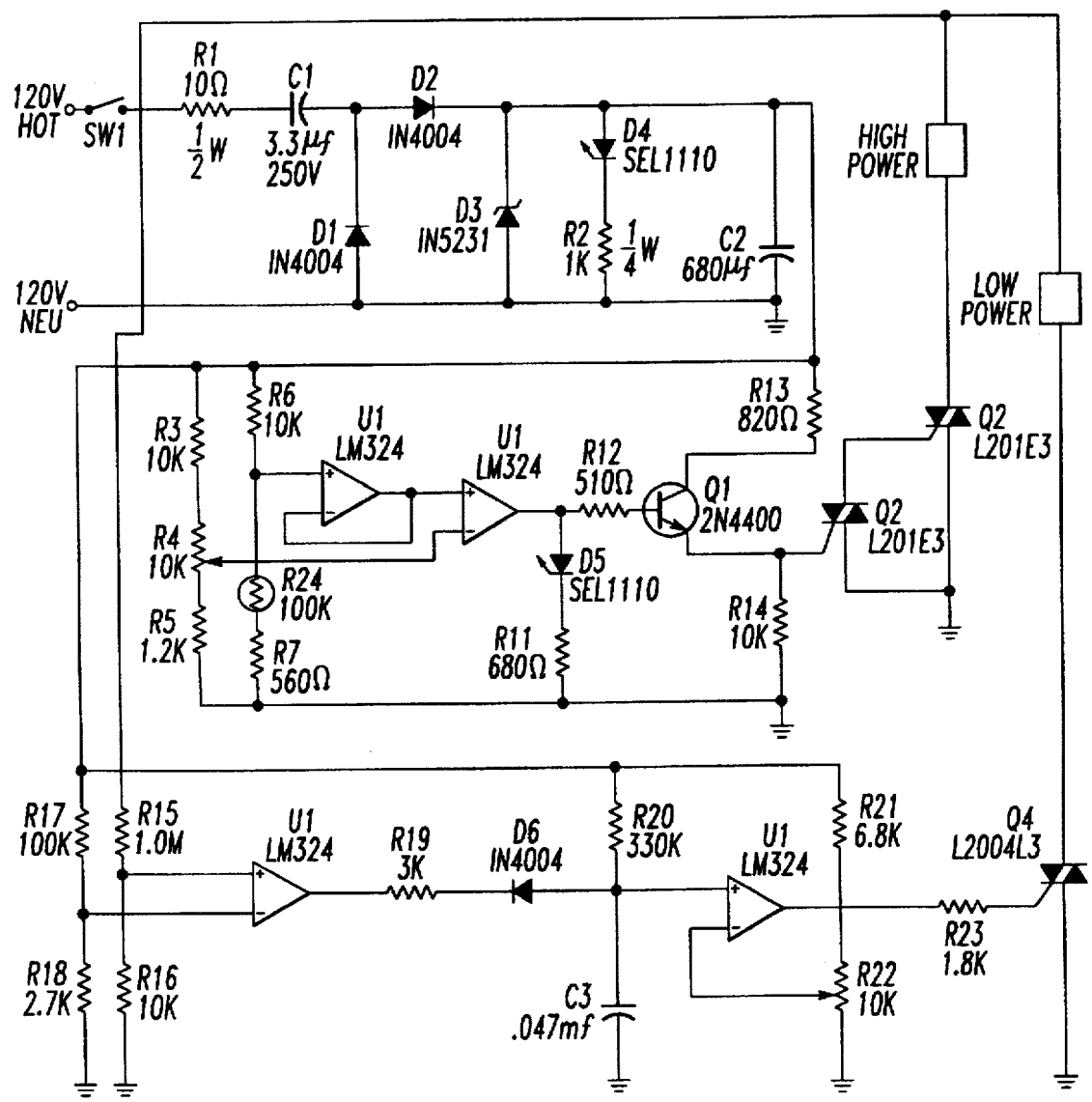
FIG. 9 is a schematic representation of the printed circuit board of the present invention.

A schematic representation of the circuit board of the present invention is shown in FIG. 9. As can be seen from the schematic, 120 volt AC power is provided as the power source. The means for supplying power to the control panel 56 is a switch designated as SW1. The AC power is half wave rectified and filtered to provide approximately 5 volts DC for the remainder of the control circuit. The "power on" indicator means is provided by an LED which is designated as D4.

The means for controlling the main heating element 52 is via a potentiometer designated as R4. A means for sensing the temperature of the main heating element 12 is via a thermistor designated as R24. If the temperature of the main heating element 12, as determined by the thermistor R24, is found to be sufficiently hot with respect to the value of the means for controlling the main heating element 52, R4, then the power to the main heating element 12 is not applied. In the event that the temperature of the main heating element 12 is not sufficiently hot, then the power is supplied to the main heating element 12. Power to the main heating element 12 is controlled by output pin 7 of the op amp designated U1. Output pin 7 of the op amp designated U1 controls a transistor, Q1, which in turn controls the first of two triacs, designated Q2. The triacs, Q2, control the flow of the AC current to the main heating element 12.

The "heating" indicator means 60 is an LED, designated D5, which is illuminated when pin 7 of the op amp designated U1 is high.

The means for controlling the smoker heating element 54 is a potentiometer designated R22. The duty cycle of a triac, designated Q4, is varied by the value of the means for controlling the smoker heating element 54.

Although the invention has been described in detail in the foregoing for the purpose of illustration, it is to be understood that such detail is solely for that purpose, and that variations can be made therein by those of ordinary skill in the art without departing from the spirit and scope of the invention as defined by the following claims. All such variations are specifically intended to be embraced within the scope of the following claims, including all equivalents thereof.

We claim:

1. An electric grill comprising:
   (a) cooking surface;
   (b) an electric main heating element;
   (c) a bottom surface, said bottom surface being sloped;
   (d) a collection means;
   (e) an electric smoker heating element located proximate said collecting means, wherein said smoker heating element comprises a center portion and first and second end portions; and
      further comprising first and second inclined portions, each having a high portion and a low portion;
      said first and second inclined portions connecting said center portion to said first and second end portions so that said center portion is connected to said low portions of said first and second inclined portions and said first and second end portions are connected to said high portions of said first and second end portions;
   (f) means for controlling said main heating element; and
   (g) means for controlling said smoker heating element.

2. The electric grill of claim 1, wherein:
   said inclined portions are inclined at 10 degrees with respect to a horizontal line.

3. The electric grill of claim 1, wherein at least a portion said smoker heating element is located within said collection means which is a smoker box.

4. The electric grill of claim 1, wherein
   said means for controlling said main heating element and said means for controlling said smoker heating element comprise solid state components.

5. The electric grill of claim 4, wherein said means for controlling said main heating element and said means for controlling said smoker heating element comprise
   (a) a power source;
   (b) means for the user to indicate a desired temperature for said main heating element;
   (c) means for the user to indicate a desired temperature for said smoker heating element;
   (d) means for controlling current to the main heating element; and
   (e) means for controlling current to the smoker heating element.

6. The electric grill of claim 5, wherein
   said means for controlling current to the main heating element comprises at least one triac; and
   said means for controlling current to the smoker heating element comprises at least one triac.

7. An electric grill comprising:
   (a) a cooking surface for cooking foodstuff placed thereon;
   (b) means for heating the cooking surface, the cooking surface heating means being positioned below and in proximate relationship to the cooking surface;
   (c) means for collecting grease and juices from the foodstuff; and
   (d) means for heating the grease and juices in the collection means wherein the grease and juices drip onto the means for heating the grease and juices such that they are vaporized.

8. The electric grill of claim 7, wherein the cooking surface has a plurality of recessed areas on the underside of the cooking surface which house the cooking surface heating means.

9. The electric grill of claim 7, wherein the cooking surface has a first channel and a plurality of second channels, wherein the first channel transverses the cooking surface and leads to the collection means, and wherein the plurality of second channels are positioned perpendicular to and extend from both sides of the first channel.

10. The electric grill of claim 7 further comprising a bottom surface.

11. The electric grill of claim 10, further comprising:
    (a) means for suspending the cooking surface heating means above the bottom surface; and
    (b) means for fastening the cooking surface heating means to the bottom surface, wherein the bottom surface is sloped.

12. The electric grill of claim 7, wherein the cooking surface heating means substantially forms an H-shaped outline.

13. An electric grill comprising:
    (a) a cooking surface;
    (b) an electric main heating element;
    (c) a bottom surface, said bottom surface being sloped;
    (d) a collection means, wherein said collection means has a bottom which defines an opening;
    (e) an electric smoker heating element located proximate said collection means, wherein said cooking surface is integrated into said bottom surface, said electric smoker heating element is located below said collection means, and said collection means is integrated into said bottom surface;
    (f) means for controlling said main heating element; and
    (g) means for controlling said smoker heating element.

* * * * *